United States Patent
Futatsugi

(10) Patent No.: US 12,545,252 B2
(45) Date of Patent: Feb. 10, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventor: Tomohiko Futatsugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 18/418,725

(22) Filed: Jan. 22, 2024

(65) Prior Publication Data

US 2024/0308508 A1    Sep. 19, 2024

(30) Foreign Application Priority Data

Mar. 15, 2023   (JP) .................. 2023-040398

(51) Int. Cl.
*B60W 30/12*   (2020.01)
*B60W 10/20*   (2006.01)
*B60W 40/09*   (2012.01)

(52) U.S. Cl.
CPC ............ *B60W 30/12* (2013.01); *B60W 10/20* (2013.01); *B60W 40/09* (2013.01); *B60W 2510/202* (2013.01); *B60W 2552/30* (2020.02)

(58) Field of Classification Search
CPC ...... B60W 10/20; B60W 30/12; B60W 40/09; B60W 2510/202; B60W 2520/10; B60W 2540/18; B60W 2540/30; B60W 2552/30; B60W 2710/20

See application file for complete search history.

(56) References Cited

U.S. PATENT DOCUMENTS

| | | | |
|---|---|---|---|
| 6,473,678 B1 | 10/2002 | Satoh et al. |
| 7,692,534 B2 | 4/2010 | Kataoka et al. |
| 8,352,124 B2 | 1/2013 | Taguchi |
| 8,682,500 B2 | 3/2014 | Sakugawa |
| 8,818,634 B2 | 8/2014 | Fujita et al. |
| 9,168,953 B2 | 10/2015 | Mitsumoto et al. |
| 9,714,034 B2 | 7/2017 | Otake et al. |

(Continued)

FOREIGN PATENT DOCUMENTS

| | | |
|---|---|---|
| JP | 2001-039326 A | 2/2001 |
| JP | 2013-184590 A | 9/2013 |

(Continued)

*Primary Examiner* — John M Zaleskas
(74) *Attorney, Agent, or Firm* — SoraIP, Inc.

(57) ABSTRACT

The vehicle control device controls the steered wheels so that the target steered angle for the vehicle to travel while maintaining a predetermined target lateral position in the travel area in which the vehicle travels matches the steered angle of the steered wheels of the vehicle. It is possible to perform lateral position control. During a non-execution period in which lateral position control is not executed, the vehicle control device learns the characteristics of the driver on a curved road, and changes the control parameters used for lateral position control based on the learned characteristics of the driver, based on an index value representing the relationship between a steering direction representing the direction in which the vehicle is traveling due to the driver's steering operation on the steering wheel and a target lateral position.

4 Claims, 6 Drawing Sheets

(56) References Cited

U.S. PATENT DOCUMENTS

| | | |
|---|---|---|
| 9,880,558 B2 | 1/2018 | Nakamura |
| 9,902,399 B2 | 2/2018 | Torii et al. |
| 10,345,443 B2 | 7/2019 | Masui et al. |
| 10,611,240 B2 | 4/2020 | Masui et al. |
| 2011/0231063 A1* | 9/2011 | Kim ............... B60W 30/18145 701/1 |
| 2015/0284008 A1* | 10/2015 | Tan ...................... B60W 10/18 701/28 |
| 2015/0348418 A1* | 12/2015 | Pfeiffer .................. G08G 1/167 340/435 |
| 2016/0297478 A1* | 10/2016 | Inoue .................. B60W 10/184 |
| 2017/0197618 A1* | 7/2017 | Ali .................... B60W 60/0016 |
| 2017/0267241 A1* | 9/2017 | Matsunaga ........... B60W 50/08 |
| 2017/0329330 A1 | 11/2017 | Hatano et al. |
| 2017/0369076 A1* | 12/2017 | Goo ..................... B60W 30/16 |
| 2018/0194365 A1* | 7/2018 | Bae ........................ G08G 1/16 |
| 2018/0290666 A1* | 10/2018 | Ichikawa ............. B60W 30/12 |
| 2019/0061769 A1* | 2/2019 | Panse .................... G06V 20/597 |
| 2019/0096258 A1 | 3/2019 | Ide et al. |
| 2019/0171211 A1* | 6/2019 | Jang ................... B60W 50/0098 |
| 2019/0256085 A1* | 8/2019 | Kim ................... B60W 30/143 |
| 2020/0047772 A1* | 2/2020 | Yasue .................. B60W 30/16 |
| 2020/0108867 A1* | 4/2020 | Eom ..................... B60W 50/14 |
| 2020/0239071 A1* | 7/2020 | Lenneman ........... B62D 15/029 |
| 2020/0241523 A1* | 7/2020 | Brandin ................ G05D 1/226 |
| 2021/0070308 A1* | 3/2021 | Kim ................... B60W 60/0053 |
| 2021/0213959 A1* | 7/2021 | Shahriari ............. G05D 1/0088 |
| 2021/0347359 A1* | 11/2021 | Nakatsuji ................. G08G 1/16 |
| 2022/0234603 A1* | 7/2022 | Mujumdar ............ B60W 40/09 |
| 2022/0234623 A1* | 7/2022 | Oh ....................... B60W 40/072 |
| 2023/0020048 A1* | 1/2023 | Baechle ................ B60W 30/12 |
| 2023/0023426 A1* | 1/2023 | Hamaguchi .......... B62D 15/025 |
| 2023/0264711 A1* | 8/2023 | Kim .................... B60W 50/082 701/23 |
| 2024/0174211 A1* | 5/2024 | Chen ................. B60W 50/0098 |

FOREIGN PATENT DOCUMENTS

| | | | | |
|---|---|---|---|---|
| JP | 2017-202720 A | | 11/2017 | |
| JP | 2019-059363 A | | 4/2019 | |
| JP | 2020-131820 A | | 8/2020 | |
| JP | 2020-192824 A | | 12/2020 | |
| KR | 20140016510 A | * | 2/2014 | ............ B60W 50/14 |
| WO | WO-2023045791 A1 | * | 3/2023 | ............ B60W 10/20 |
| WO | WO-2024028098 A1 | * | 2/2024 | ............ B60W 10/20 |

\* cited by examiner

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2023-040398 filed on Mar. 15, 2023, incorporated herein by reference in its entirety.

BACKGROUND

1. Technical Field

The present disclosure relates to a vehicle control device that executes lateral position control for controlling steered wheels such that a vehicle travels while maintaining a target lateral position in a travel area, a vehicle control method in which a computer mounted on the vehicle executes the lateral position control, and a storage medium that stores a program that causes the computer to execute the lateral position control.

2. Description of Related Art

There have conventionally been known vehicle control devices that execute lateral position control (lane keeping control) for controlling steered wheels such that a vehicle travels while maintaining a target lateral position in a travel area. For example, Japanese Unexamined Patent Application Publication No. 2019-59363 (JP 2019-59363 A) describes a vehicle control device (hereinafter referred to as a "conventional device") which reduces the responsiveness of lateral position control by reducing control parameters (an upper limit value of a target steering angle and an upper limit value of a target steering angular velocity) to be used in the lateral position control when the reliability of the recognition result of a marking line that divides a travel area is low.

SUMMARY

Drivers tend to have different characteristics when traveling on a curved road. For example, some drivers have a characteristic (inside characteristic) that causes the vehicle to travel on the inner side of a curved road, while other drivers have a characteristic (outside characteristic) that causes the vehicle to drive on the outer side of a curved road.

Conventional devices can execute lateral position control according to the reliability of the recognition result of a marking line, but cannot execute lateral position control according to the characteristics of a driver on a curved road. Lateral position control that does not suit the characteristics of a driver may give a sense of discomfort and anxiety to the driver.

The present disclosure has been made to address the above-mentioned issue. That is, an object of the present disclosure is to provide a vehicle control device that can execute lateral position control according to the characteristics of a driver on a curved road and that can reduce the possibility that the lateral position control gives a sense of discomfort and anxiety to the driver.

A vehicle control device according to an aspect of the present disclosure (hereinafter also referred to as a "present disclosure device") is a vehicle control device (10) that is able to execute lateral position control for controlling steered wheels of a vehicle (VA) such that a target steered angle ($\theta$tgt) for the vehicle to travel while maintaining a predetermined target lateral position (Ltgt) in a travel area (TA) in which the vehicle travels matches a steered angle ($\theta$t) of the steered wheels of the vehicle, in which the vehicle control device is configured to: learn characteristics of a driver on a curved road based on an index value in a non-execution period in which the lateral position control is not executed, the index value indicating a relationship between a steering travel direction and the target lateral position, and the steering travel direction indicating a travel direction of the vehicle due to a steering operation on a steering wheel by the driver (steps 430 to 445, step 455, and step 460); and change control parameters to be used in the lateral position control based on the learned characteristics of the driver (steps 525 to 535 and steps 580 to 590).

During the non-execution period, the present disclosure device learns the characteristics of the driver on a curved road based on the index value indicating the relationship between the steering travel direction and the target lateral position. Then, the present disclosure device changes the control parameters to be used in the lateral position control based on the learned characteristics of the driver. Consequently, the lateral position control is executed using control parameters that match the characteristics of the driver, and thus it is possible to reduce the possibility that the lateral position control gives a sense of discomfort and anxiety to the driver.

For example, the present disclosure device determines the characteristics of the driver as the inside characteristics when the steering travel direction during the non-execution period tends to be on the inner side with respect to the target lateral position, and determines the characteristics of the driver as the outside characteristics when the steering travel direction during the non-execution period tends to be on the outer side with respect to the target lateral position.

The control parameters include a control threshold angle and a control gain.

Control Threshold Angle

The present disclosure device controls the steered wheels such that the steered angle matches the target steered angle when the magnitude of the difference between the target steered angle and the steered angle becomes equal to or greater than the control threshold angle during a period in which the lateral position control is executed.

A driver with the inside characteristics tends to start a steering operation for a curved road at an earlier timing than a driver with the outside characteristics. Therefore, the present disclosure device makes the control threshold angle smaller when the characteristics of the drive are the inside characteristics than when the characteristics of the driver are the outside characteristics. Consequently, it is possible to reduce the possibility that a driver with the inside characteristics feels a sense of discomfort and anxiety about the lateral position control because of a delay in the lateral position control starting control for the steered wheels.

Control Gain

The present disclosure device acquires the target steering angle $\theta$tgt based on the position of the vehicle with respect to the target lateral position and the control gain (see equation (1) below). As the control gain is larger, the target steered angle tends to be larger, and thus the magnitude of the difference between the target steered angle and the steered angle tends to be equal to or greater than the control threshold angle. Therefore, the present disclosure device makes the control gain larger when the characteristics of the driver are the inside characteristics than when the characteristics of the driver are the outside characteristics.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
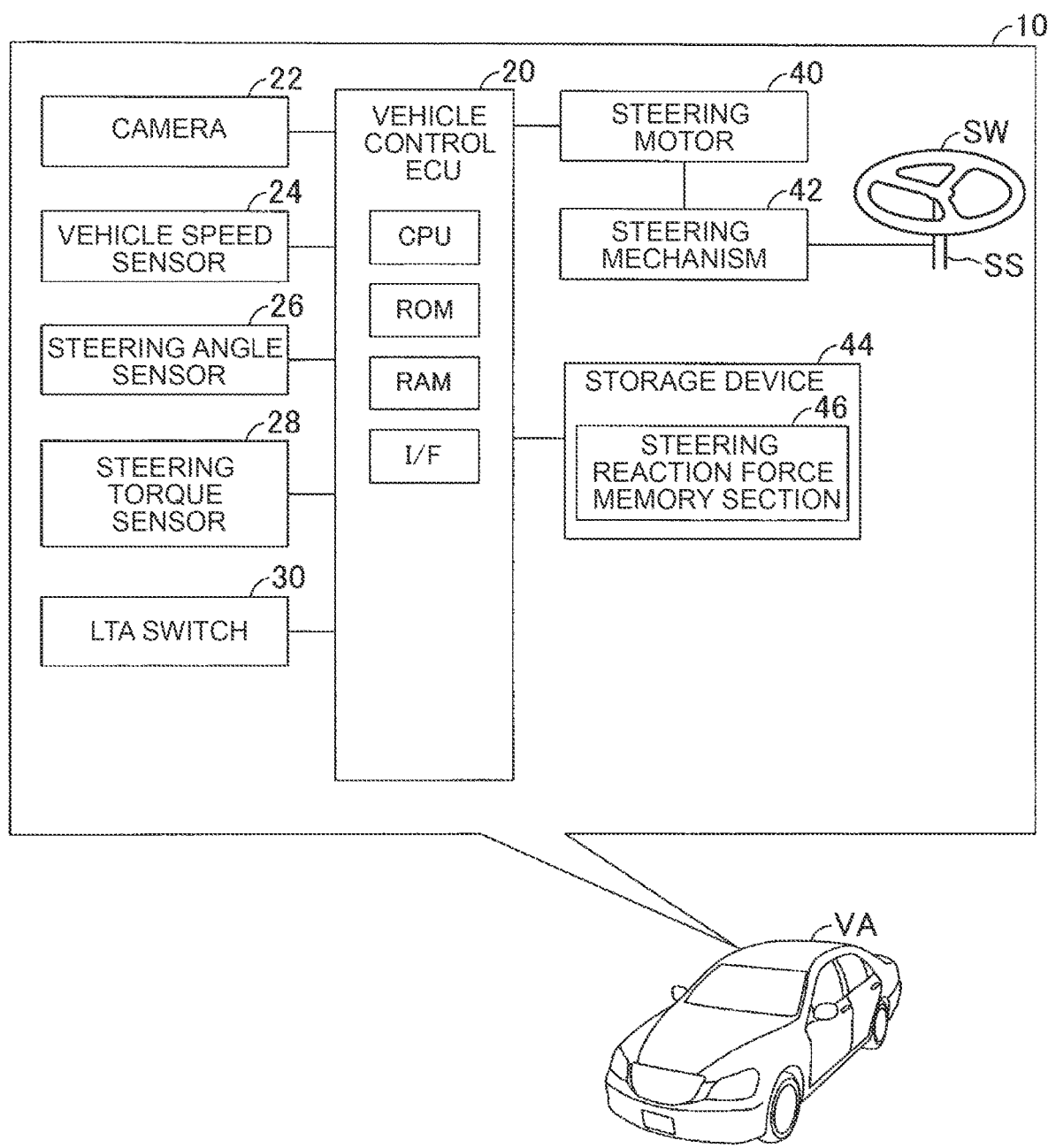
FIG. 1 is a schematic system configuration diagram of a vehicle control device according to an embodiment of the present disclosure.

As shown in FIG. 1, a vehicle control device (hereinafter referred to as "the present device") 10 according to the present embodiment is applied to a vehicle VA and includes the components shown in FIG. 1.

The vehicle control ECU 20 is an ECU that can perform steering support control and lateral position control. Vehicle control ECU 20 is hereinafter referred to as "ECU 20".

Steering support control is executed during a non-execution period when lateral position control is not executed. Specifically, the steering assist control applies the "steering reaction force Fs for prompting the driver to perform a steering operation to cause the vehicle VA to travel at the target lateral position Ltgt in the travel area TA" to the steering wheel SW in a direction opposite to the direction of the driver's steering operation of the steering wheel SW. Thereby, the steering support control can support the driver's steering operation. See FIG. 2 for the travel area TA and target lateral position Ltgt.

The lateral position control is control for controlling the steered wheels of the vehicle VA so that the vehicle VA travels while maintaining the target lateral position Ltgt without the driver performing a steering operation on the steering wheel SW. Note that lateral position control is sometimes referred to as "lane keeping control" and "LTA (Lane Tracing Assist)".

ECU 20 is an electronic control unit that includes a microcomputer as its main part. ECU 20 is also called a controller or a computer. A microcomputer includes a CPU (processor), ROM, RAM, interface (I/F), and the like. The CPU realizes various functions by executing instructions (routines) stored in the memory (ROM). At least one function realized by ECU 20 may be realized by multiple ECUs.

The camera 22 acquires image data by photographing the scenery in front of the vehicle VA. The camera 22 acquires boundary information based on image data. The boundary information includes the position of the boundary BL that defines the travel area TA with respect to the vehicle VA. Examples of the boundary BL include white lines on a road, guardrails, curbs, and walls. Camera 22 transmits image data and boundary information to ECU 20.

Vehicle speed sensor 24 detects vehicle speed Vs representing the speed of vehicle VA. The steered angle sensor 26 detects the steered angle θt of the steered wheels. Steering torque sensor 28 detects steering torque Tr applied to steering shaft SS. Steering shaft SS is connected to steering wheel SW. The ECU 20 acquires detection values from these sensors 24 to 28.

The LTA switch 30 is arranged on the steering wheel SW. If LTA is not being executed, the driver operates LTA switch 30 to start LTA. If LTA is being executed, the driver operates LTA switch 30 to end LTA. ECU 20 detects the driver's operation on LTA switch 30.

Steering motor 40 is incorporated into steering mechanism 42. The steering mechanism 42 is a mechanism for steering the steered wheels in response to a steering operation of the steering wheel SW. When LTA is being executed, the steering motor 40 causes the steering mechanism 42 to generate torque for making the steering angle θt match the target steering angle θtgt. If LTA is not being executed, the steering motor 40 causes the steering mechanism 42 to generate a torque for generating a steering reaction force Fs in the steering wheel SW.

The storage device 44 is, for example, a nonvolatile storage device. The storage device 44 includes a steering reaction force storage unit 46. The steering reaction force storage unit 46 is a storage area that stores the steering reaction force Fs during the non-execution period when LTA is not executed.

Steering Support Control

Steering assist control will be explained with reference to FIG. 2. The ECU 20 recognizes a right boundary RBL that defines the right end of the travel area TA and a left boundary LBL that defines the left end of the travel area TA based on the boundary information. The ECU 20 sets the target lateral position Ltgt at a predetermined lateral position in the width direction of the travel area TA determined by the right boundary RBL and the left boundary LBL.

ECU 20 obtains target turning angle θtgt based on the position of vehicle VA with respect to target lateral position Ltgt. Specifically, the ECU 20 obtains the target steering angle θtgt based on the following equation (1).

$$\theta tgt = k1 \cdot CL + k2 \cdot \theta L + k3 \cdot dL \qquad (1)$$

In equation (1), k1, k2, and k3 are control gains, each of which is a constant.

CL represents the curvature of the target lateral position Ltgt. When the vehicle VA turns to the left, the value of the curvature CL becomes a negative value. When the vehicle VA turns to the right, the value of the curvature CL becomes a positive value. θL is an angle (yaw angle) between the direction of the target lateral position Ltgt and the longitudinal direction of the vehicle VA. When the longitudinal direction of the vehicle VA is to the left of the direction of the target lateral position Ltgt, the yaw angle θL takes a negative value. When the longitudinal direction of the vehicle VA is to the right of the direction of the target lateral position Ltgt, the yaw angle θL takes a positive value. dL is the distance (lateral deviation) in the width direction of the travel area TA between "a reference point preset at a predetermined position of the vehicle VA" and the target lateral position Ltgt. When the reference point P is located to the left of the target lateral position Ltgt, the lateral deviation dL takes a negative value. When the reference point P is located on the right side of the target lateral position Ltgt, the lateral deviation dL takes a positive value.

The ECU 20 determines whether the inner condition is satisfied and whether the outer condition is satisfied based on a subtraction value dθ obtained by subtracting the target turning angle θtgt from the current turning angle θt.

Inside condition: The absolute value of the subtraction value dθ is greater than or equal to the threshold angle dθth, and the value obtained by multiplying the target steering angle θtgt by the subtraction value dθ is positive.

Outside condition: The absolute value of the subtraction value dθ is greater than or equal to the threshold angle dθth, and the value obtained by multiplying the target steering angle θtgt by the subtraction value dθ is negative.

If the inside condition is satisfied, the ECU 20 determines that the direction in which the vehicle VA moves due to the driver's steering operation (hereinafter referred to as the "steering direction") is inside the target lateral position Ltgt. If the outside condition is satisfied, the ECU 20 determines that the steering direction is outside the target lateral position Ltgt.

When the inside condition is satisfied, the ECU 20 makes the steering reaction force Fs larger than when neither the inside condition nor the outside condition is satisfied. This makes it difficult for the driver to perform a steering operation toward the inside of the curved road compared to normal times. Therefore, the steering reaction force Fs can prompt the driver to perform a steering operation to cause the vehicle VA to travel at the target lateral position Ltgt.

When the outside condition is satisfied, the ECU 20 makes the steering reaction force Fs smaller than when neither the inner condition nor the outer condition is satisfied. This makes it easier for the driver to perform a steering operation toward the inside of the curved road compared to normal times. Therefore, the steering reaction force Fs can prompt the driver to perform a steering operation to cause the vehicle VA to travel at the target lateral position Ltgt.

Figure 2:
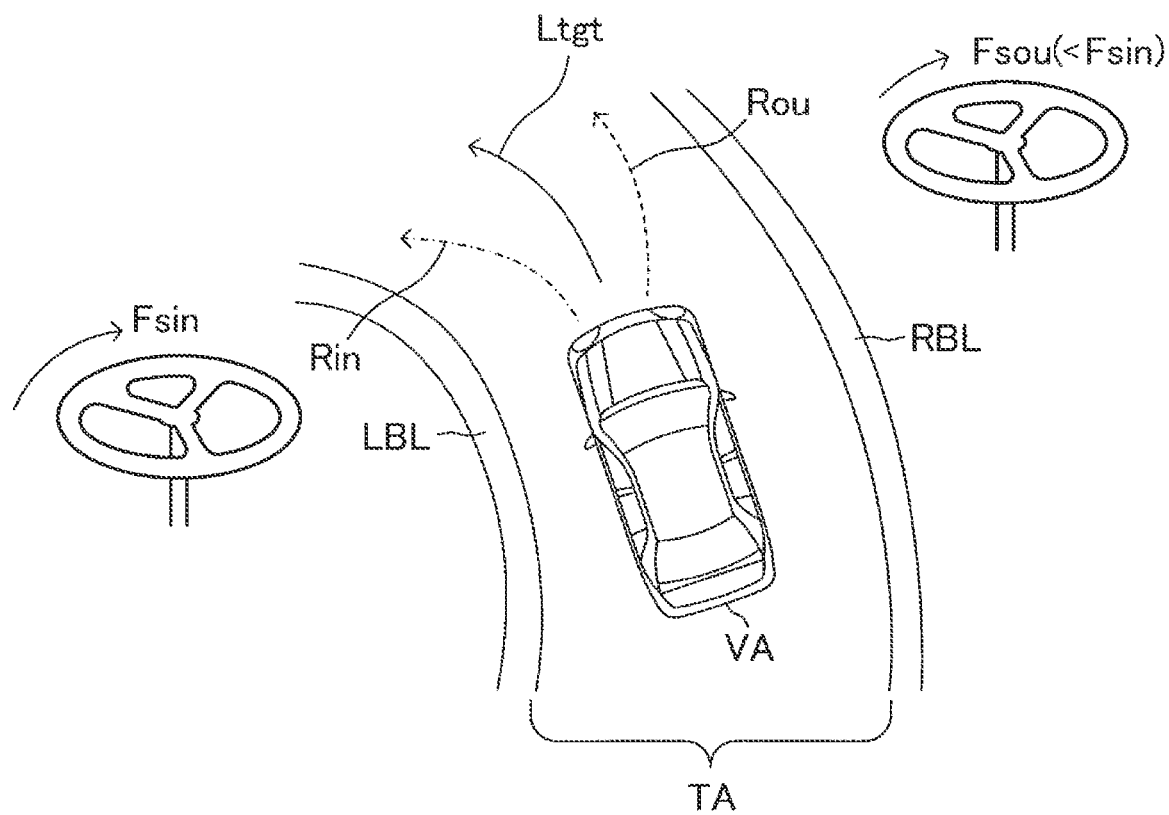
FIG. 2 is an explanatory diagram of steering support control executed by the vehicle control device according to the embodiment of the present disclosure.

When the vehicle VA travels on the route Rin shown in FIG. 2, which is inside the target lateral position Ltgt, the inside condition is satisfied. In this case, a larger steering reaction force Fsin than normal is generated.

When the vehicle VA travels on the route Rou shown in FIG. 2, which is outside the target lateral position Ltgt, the outside condition is satisfied. In this case, a larger steering reaction force Fsou than normal is generated.

As described above, the magnitude of the steering reaction force Fs becomes large when the steering direction is inside the target lateral position Ltgt, and becomes small when the steering direction is outside the target lateral position Ltgt. Therefore, the steering reaction force Fs becomes an index value representing the relationship between the steering direction and the target lateral position Ltgt.

Lateral Position Control

When LTA is being executed, the ECU 20 obtains the target turning angle θtgt using the above equation (1), and obtains the subtraction value dθ (dθ=θt−θtgt). During the period from when the control condition that the absolute value of the subtraction value dθ is equal to or greater than the control threshold angle θtth is established until both the target steering angle θtgt and the subtraction value dθ become "0", the ECU 20 performs steering control. The steering motor 40 is controlled so that the angle θt matches the target turning angle θtgt. Note that if the control conditions are not satisfied, the ECU 20 does not control the steering motor 40 so that the turning angle θt matches the target turning angle θtgt, and does not substantially perform lateral position control.

If the magnitude of the steering operation torque Trs becomes equal to or greater than the threshold torque Trth during execution of LTA, the ECU 20 ends LTA. During execution of LTA, when the steering angle θt is changed, the steering angle of the steering wheel is changed to an angle corresponding to the changed steering angle θt. The steering operation torque Trs is obtained by subtracting the steering torque Tr from the torque applied to the steering shaft SS by the steering motor 40.

Operation Overview

The ECU 20 of the present device 10 learns the characteristics of the driver on a curved road based on the index value (steering reaction force Fs) representing the relationship between the steering direction and the target lateral position Ltgt during the LTA non-execution period. Specifically, the ECU 20 learns whether the driver's characteristic is an inside characteristic, an outside characteristic, or a normal characteristic.

ECU 20 changes control parameters based on the learned characteristics of the driver. The control parameters include the control threshold angle θtth and the control gains k1, k2, and k3 in the above equation (1).

When Driver's Characteristics are Normal Characteristics

The ECU 20 sets the control threshold angle θtth to "θtmi" and sets the control gains k1, k2, and k3 to "k1mi", "k2 mi", and "k3 mi".

When Driver's Characteristics are Internal Characteristics

The ECU 20 sets the control threshold angle θtth to "θtin", and sets the control gains k1, k2, and k3 to "k1in", "k2 in", and "k3 in". Note that θtin is set to a smaller value than θtmi. Furthermore, k1in, k2 in, and k3 in are set to larger values than k1mi, k2 mi, and k3 mi, respectively. If the driver has the inside characteristic, the control threshold angle θtth will be smaller than in normal times, and the control gains (k1, k2, and k3) will be larger than in normal times. This allows the ECU 20 to execute lateral position control that matches the inside characteristics, thereby reducing the possibility that lateral position control will cause discomfort and anxiety to the driver.

When Driver's Characteristics are External Characteristics

The ECU 20 sets the control threshold angle θtth to "θtou", and sets the control gains k1, k2, and k3 to "k1ou", "k2ou", and "k3ou". Note that θtou is set to a larger value than θtmi. Furthermore, k1ou, k2ou, and k3ou are set to values smaller than k1mi, k2 mi, and k3 mi, respectively. When the driver has the outside characteristic, the control threshold angle θtth becomes larger than in normal times, and the control gains (k1, k2, and k3) become smaller than in normal times. This allows the ECU 20 to perform lateral position control that matches the outside characteristics. Therefore, it is possible to reduce the possibility that the lateral position control will cause discomfort and anxiety to the driver.

Concrete Operation

LTA Start/End Determination Routine

Figure 3:
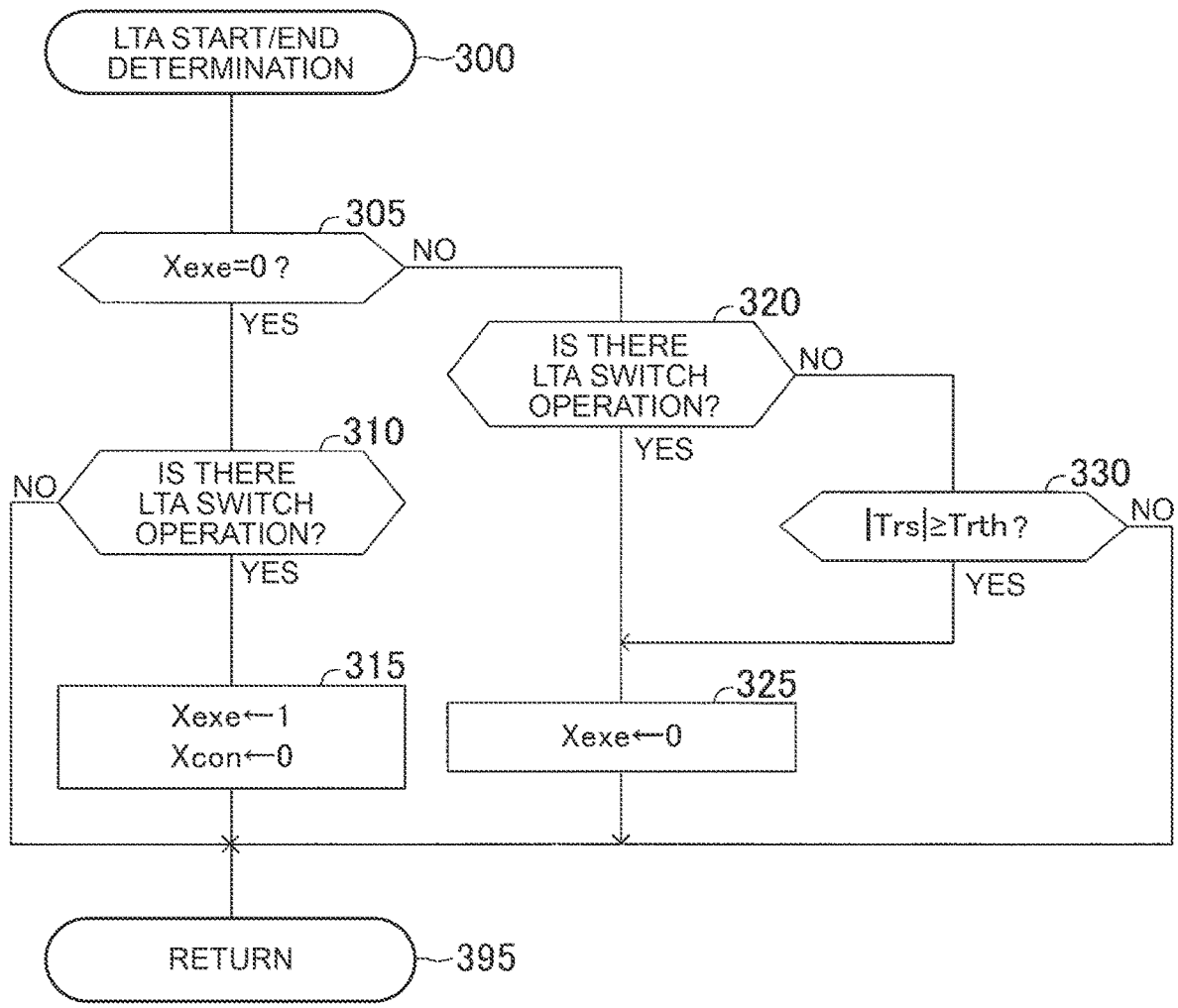
FIG. 3 is a flowchart showing an LTA start/end determination routine executed by the CPU of the vehicle control ECU shown in FIG. 1.

The CPU of the ECU 20 executes the LTA start/end determination routine shown in the flowchart in FIG. 3 every time a predetermined period of time elapses.

Therefore, at a predetermined timing, the CPU starts processing from step 300 in FIG. 3 and proceeds to step 305. In step 305, the CPU determines whether the value of the execution flag Xexe is "0".

The value of the execution flag Xexe is set to "1" when LTA starts, and is set to "0" when LTA ends. Note that the value of the execution flag Xexe is set to "0" in the initial routine.

If the value of the execution flag Xexe is "0", the CPU determines "Yes" in step 305 and proceeds to step 310. At step 310, the CPU determines whether the LTA switch 30 has been operated.

If the LTA switch 30 is not operated, the CPU determines "No" in step 310. Thereafter, the CPU proceeds to step 395 and temporarily ends this routine.

If the LTA switch 30 is operated, the CPU determines "Yes" in step 310 and proceeds to step 315. In step 315, the CPU sets the value of the execution flag Xexe to "1" and the value of the control flag Xcon to "0". The value of the control flag Xcon is set to "1" when the steering motor 40 is actually controlled in LTA, and is set to "0" when the steering motor 40 is not actually controlled in LTA. Thereafter, the CPU proceeds to step 395 and temporarily ends this routine.

If the value of the execution flag Xexe is "1" when the CPU proceeds to step 305, the CPU determines "No" in step 305, and proceeds to step 320. At step 320, the CPU determines whether the LTA switch 30 has been operated.

If the LTA switch 30 is operated, the CPU determines "Yes" in step 320 and proceeds to step 325. In step 325, the CPU sets the value of the execution flag Xexe to "0". Thereafter, the CPU proceeds to step 395 and temporarily ends this routine.

If the LTA switch 30 has not been operated, the CPU determines "No" in step 320 and proceeds to step 330. At step 330, the CPU determines whether the magnitude of the steering operation torque Trs is greater than or equal to the threshold torque Trth.

If the magnitude of the steering operation torque Trs is greater than or equal to the threshold torque Trth, the CPU determines "Yes" in step 330, and sets the value of the execution flag Xexe to "0" in step 325. Thereafter, the CPU proceeds to step 395 and temporarily ends this routine.

If the magnitude of the steering operation torque Trs is less than the threshold torque Trth, the CPU determines "No" in step 330, proceeds to step 395, and temporarily ends this routine.

Steering Support Control Routine

Figure 4:
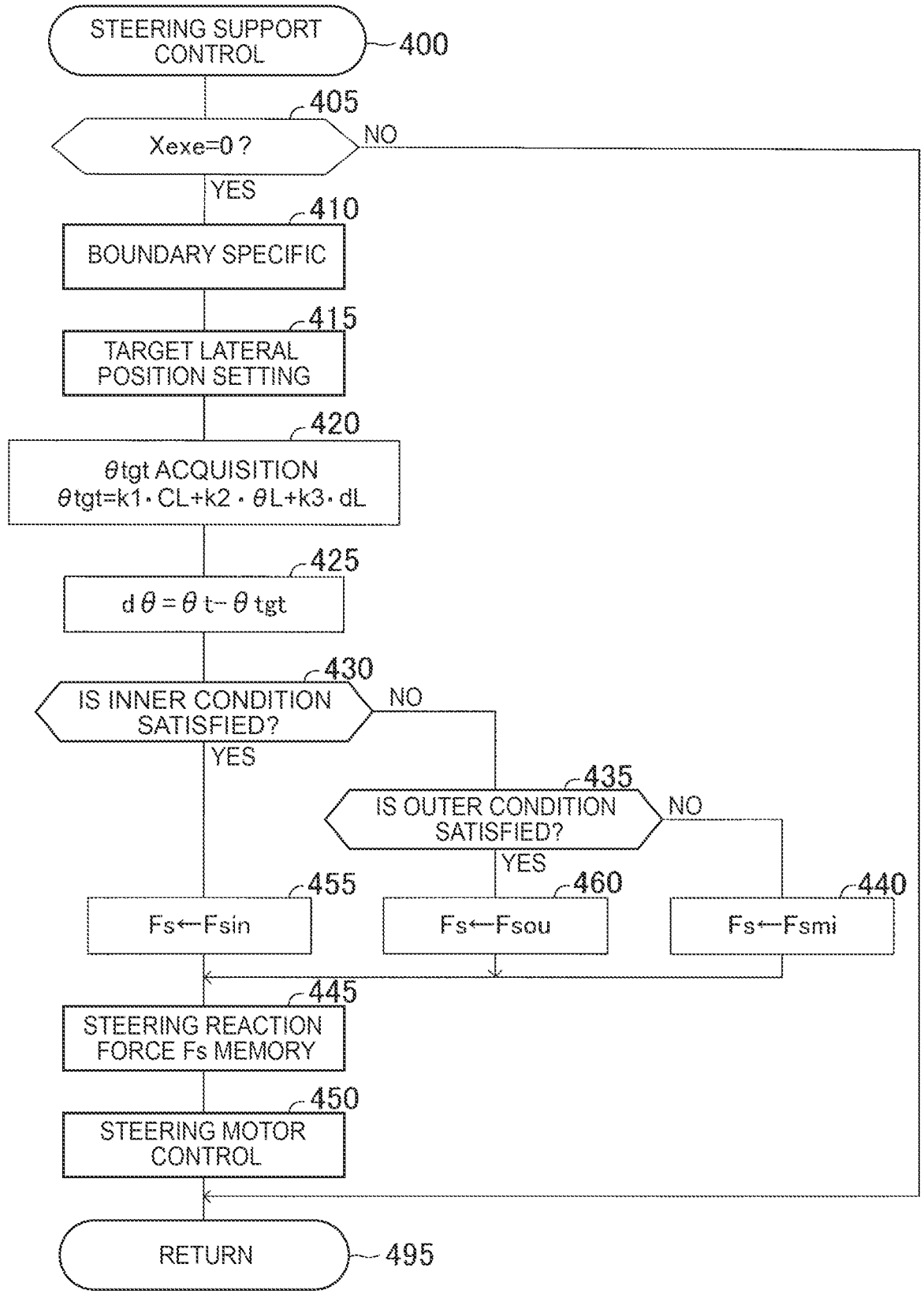
FIG. 4 is a flowchart showing a steering support control routine executed by the CPU of the vehicle control ECU shown in FIG. 1.

The CPU of the ECU 20 executes the steering support control routine shown in the flowchart in FIG. 4 every predetermined time period.

Therefore, at a predetermined timing, the CPU starts processing from step 400 in FIG. 4 and proceeds to step 405. In step 405, the CPU determines whether the value of the execution flag Xexe is "0".

If the value of the execution flag Xexe is "0", the CPU determines "Yes" in step 405, and sequentially executes steps 410 to 430.

Step 410: The CPU identifies the boundary BL based on the boundary information.
Step 415: The CPU sets the target lateral position Ltgt at a predetermined lateral position of the travel area TA determined by the boundary BL.
Step 420: The CPU obtains the target steering angle θtgt based on the above equation (1).
Step 425: The CPU obtains a subtraction value dθ by subtracting the target turning angle θtgt from the turning angle θt.
Step 430: The CPU determines whether the inner condition is satisfied.

If the inner condition is not satisfied, the CPU determines "No" in step 430 and proceeds to step 435. At step 435, the CPU determines whether the outer condition is satisfied.

If the outer condition is not satisfied, the CPU determines "No" in step 435 and proceeds to step 440. At step 440, the CPU sets the steering reaction force Fs to "Fsmi". Thereafter, the CPU executes step 445 and step 450.

Step 445: The CPU stores the steering reaction force Fs in the steering reaction force storage unit 46.
Step 450: The CPU controls the steering motor 40 so that a steering reaction force Fs is generated on the steering wheel SW in a direction opposite to the direction of the steering operation by the driver.

Thereafter, the CPU proceeds to step 495 and temporarily ends this routine.

If the inner condition is satisfied when the CPU proceeds to step 430, the CPU determines "Yes" in step 430, and proceeds to step 455. In step 455, the CPU sets the steering reaction force Fs to "Fsin". Note that Fsin is set to a larger value than Fsmi. Thereafter, the CPU executes step 445 and step 450, proceeds to step 495, and temporarily ends this routine.

If the outer condition is satisfied when the CPU proceeds to step 435, the CPU determines "Yes" in step 435, and proceeds to step 460. At step 460, the CPU sets the steering reaction force Fs to "Fsou". Note that Fsou is set to a smaller value than Fsmi. Thereafter, the CPU executes step 445 and step 450, proceeds to step 495, and temporarily ends this routine.

If the value of the execution flag Xexe is "1" when the CPU proceeds to step 405, the CPU determines "No" in step 405, proceeds to step 495, and temporarily ends this routine.

LTA Routine

Figure 5:
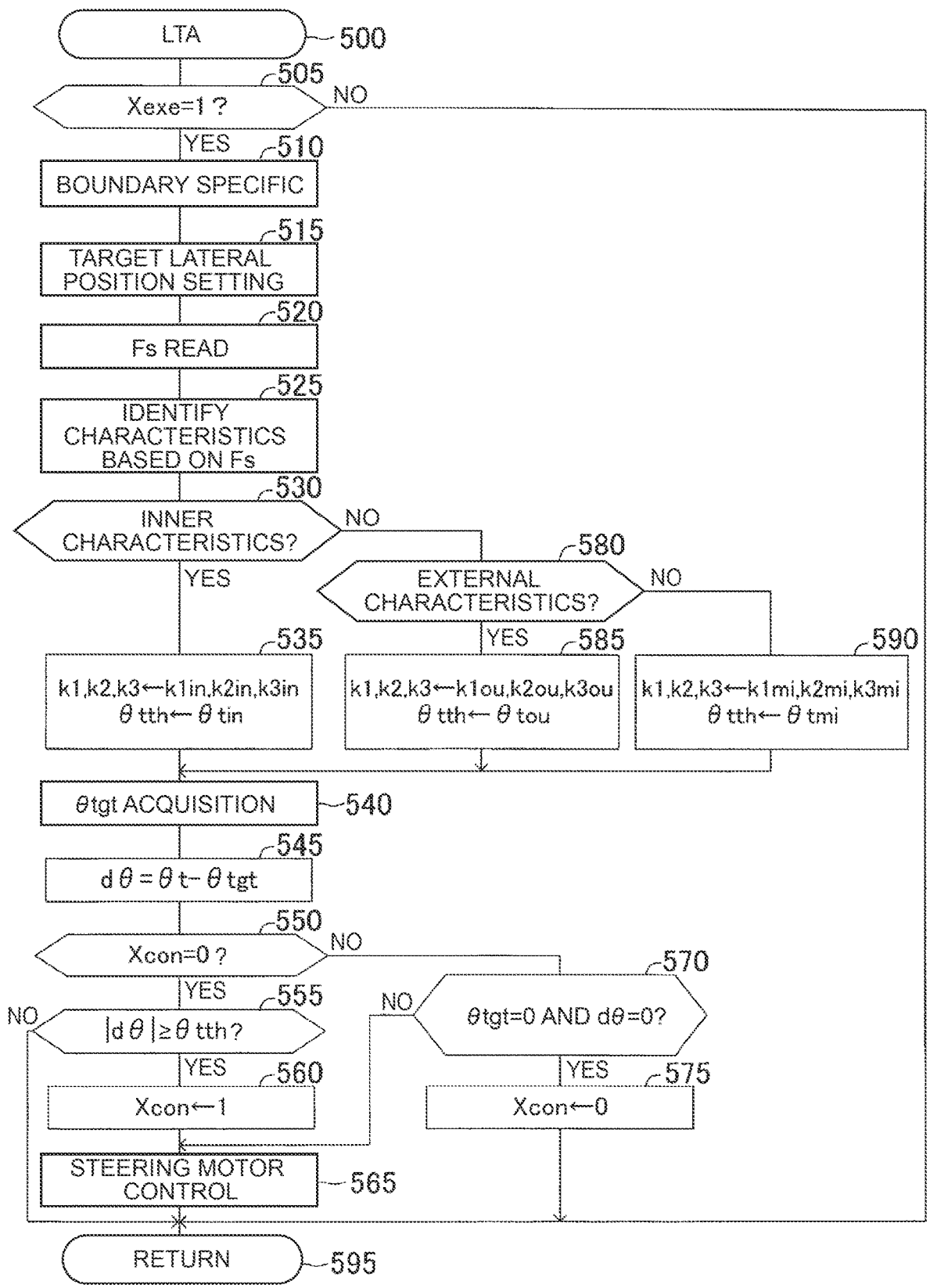
FIG. 5 is a flowchart showing an LTA routine executed by the CPU of the vehicle control ECU shown in FIG. 1.

The CPU of the ECU 20 executes the LTA routine shown in the flowchart in FIG. 5 every predetermined time period.

Therefore, at a predetermined timing, the CPU starts the process from step 500 shown in FIG. 5 and proceeds to step 505. In step 505, the CPU determines whether the value of the execution flag Xexe is "1".

If the value of the execution flag Xexe is "0", the CPU determines "No" in step 505, proceeds to step 595, and temporarily ends this routine.

If the value of the execution flag Xexe is "1", the CPU determines "Yes" in step 505 and executes steps 510 to 530.
Step 510: The CPU identifies the boundary BL.
Step 515: The CPU sets the target lateral position Ltgt.
Step 520: The CPU reads the steering reaction force Fs from the steering reaction force storage unit 46.
Step 525: The CPU specifies the characteristics of the driver based on the read steering reaction force Fs.

Specifically, the CPU obtains the larger number of Fsin and Fsou stored in the steering reaction force storage unit 46 as the stored number N. If the number of memories of Fsin is large and the number of memories Nm is greater than or equal to the threshold value Nmth, the CPU specifies the driver's characteristic as the inside characteristic. When the number of memories of Fsou is large and the number of memories Nm is greater than or equal to the threshold value Nmth, the CPU specifies the driver's characteristics as outside characteristics. Note that when the number of memories Nm is less than the threshold value Nmth, the CPU specifies the driver's characteristics as normal characteristics.

Step 530: The CPU determines whether the driver's characteristic is an inside characteristic.

If the driver's characteristic is the inside characteristic, the CPU determines "Yes" in step 530, and executes steps 535 to 550.

Step 535: The CPU sets the control gains k1, k2, and k3 to "k1in", "k2 in", and "k3 in", respectively, and sets the control threshold angle θtth to "θtin".

Step 540: The CPU obtains the target steering angle θtgt based on the above equation (1).

Step 545: The CPU obtains the subtraction value dθ.

Step 550: The CPU determines whether the value of the control flag Xcon is "0".

If the value of the control flag Xcon is "0", the CPU determines "Yes" in step 550 and proceeds to step 555. In step 555, the CPU determines whether the magnitude of the subtraction value dθ is greater than or equal to the control threshold angle θtth.

If the magnitude of the subtraction value dθ is less than the control threshold angle θtth, the CPU determines "No" in step 555, proceeds to step 595, and temporarily ends this routine.

If the magnitude of the subtraction value dθ is greater than or equal to the control threshold angle θtth, the CPU determines "Yes" in step 555, and executes steps 560 and 565.

Step 560: The CPU sets the value of the control flag Xcon to "1".

Step 565: The CPU controls the steering motor 40 so that the turning angle θt matches the target turning angle θtgt.

After that, the CPU proceeds to step 595 and temporarily ends this routine.

If the value of the control flag Xcon is "1" when the CPU proceeds to step 550, the CPU determines "No" in step 550, and proceeds to step 570. At step 570, the CPU determines whether both the target turning angle θtgt and the subtraction value dθ are "0".

If at least one of the target steering angle θtgt and the subtraction value dθ is not "0", the CPU determines "No" in step 570 and proceeds to step 565.

If both the target steering angle θtgt and the subtraction value dθ are "0", the CPU determines "Yes" in step 570 and proceeds to step 575. In step 575, the CPU sets the value of the control flag Xcon to "0". After that, the CPU proceeds to step 595 and temporarily ends this routine.

If the driver's characteristic is not the inside characteristic when the CPU proceeds to step 530, the CPU determines "No" in step 530, and proceeds to step 580. At step 580, the CPU determines whether the driver's characteristics are outside characteristics.

If the driver's characteristic is the outside characteristic, the CPU determines "Yes" in step 580 and proceeds to step 585. In step 585, the CPU sets the control gains k1, k2, and k3 to "k1ou", "k2ou", and "k3ou", respectively, and sets the control threshold angle θtth to "θtou". Thereafter, the CPU proceeds to step 540.

If the driver's characteristics are not outside characteristics when the CPU proceeds to step 580 (that is, the driver's characteristics are normal characteristics), the CPU determines "Yes" in step 580 and proceeds to step 590. In step 590, the CPU sets the control gains k1, k2, and k3 to "k1mi", "k2 mi", and "k3 mi", respectively, and sets the control threshold angle θtth to "θtmi". Thereafter, the CPU proceeds to step 540.

As explained above, the CPU learns the characteristics of the driver based on the steering reaction force Fs, and changes the control parameters in accordance with the characteristics of the driver. This allows the CPU to execute LTA tailored to the characteristics of the driver. In other words, the CPU can reduce the possibility that LTA will give the driver a sense of anxiety and discomfort.

The present disclosure is not limited to the embodiments described above, and various modifications of the present disclosure can be adopted.

First Modification

The CPU of the ECU 20 according to this modification stores the steering torque Tr as well as the steering reaction force Fs in the steering reaction force storage unit 46 during the non-execution period of LTA. Based on the steering reaction force Fs and the steering torque Tr, the CPU obtains the number of times of steering Ns by the driver during the period when the inside condition is satisfied, in which the driver steers the steering wheel SW against the steering reaction force Fs. When the number of times of steering Ns is equal to or greater than the threshold number Nsth, the CPU sets the threshold torque Trth to "Trb", which is smaller than the normal value (Tra).

When the inside condition is satisfied, the steering reaction force Fs is increased so that it becomes difficult to perform a steering operation toward the inside of the curved road. When the number of times of steering Ns is equal to or greater than the threshold number of times Nsth, there is a possibility that the driver performs a steering operation such that the vehicle VA passes on the inside of the curved road for more than the threshold number of times Nsth against such steering reaction force Fs. is high. Therefore, it is highly likely that such drivers prefer driving on the inside of curved roads. Therefore, by setting the threshold torque Trth to "Trb", the CPU makes it easier to complete LTA than in normal times. Thereby, LTA can be executed in accordance with the characteristics of the driver.

Figure 6:
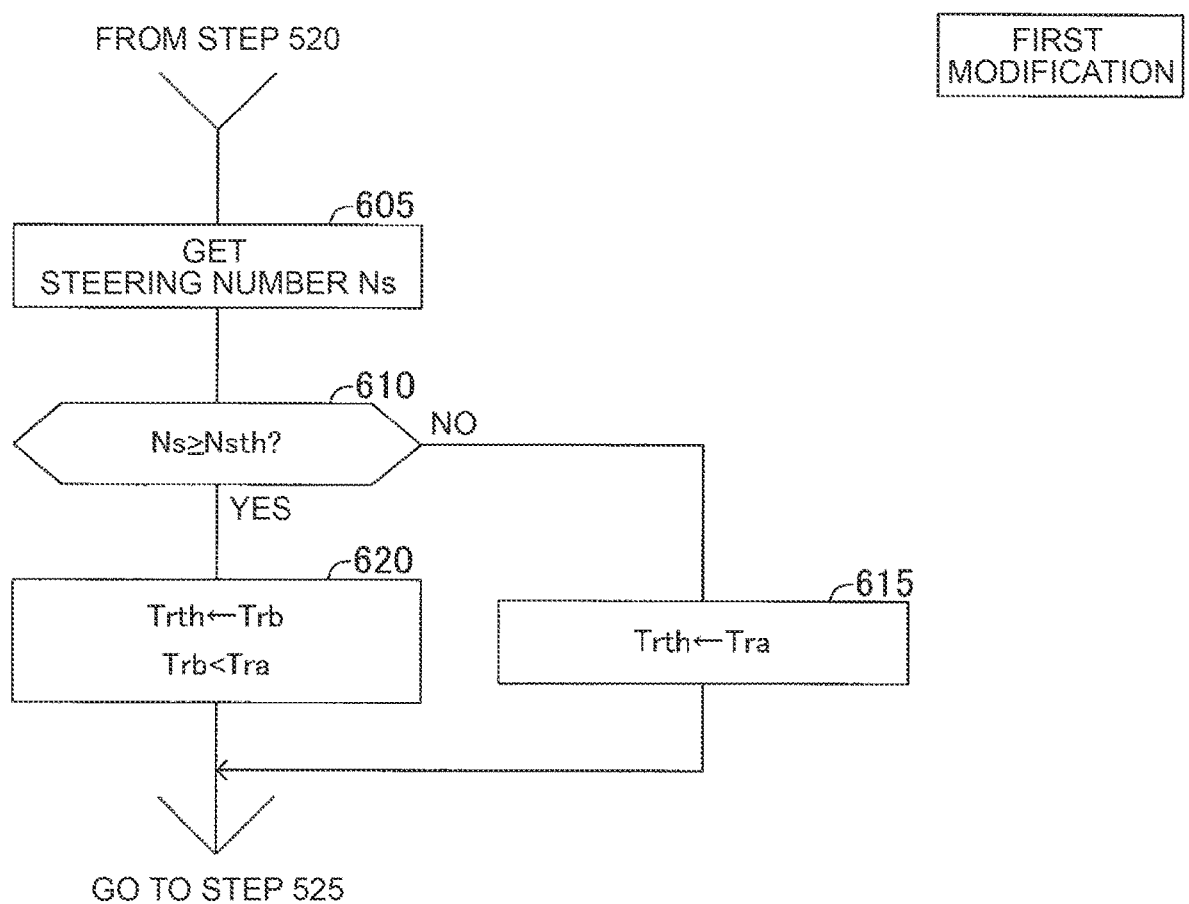
FIG. 6 is a flowchart showing a part of the LTA routine executed by the CPU of the vehicle control ECU according to the first modification of the embodiment of the present disclosure.

After executing step 520 shown in FIG. 5, the CPU executes step 605 and step 610 shown in FIG. 6.

Step 605: The CPU obtains the number of times of steering Ns.

Step 610: The CPU determines whether the number of times of steering Ns is greater than or equal to the threshold number of times Nsth.

If the number of times of steering Ns is less than the threshold number of times Nsth, the CPU determines "No" in step 610 and proceeds to step 615. In step 615, the CPU sets the threshold torque Trth to "Tra". Thereafter, the CPU proceeds to step 525 shown in FIG. 5.

If the number of times of steering Ns is equal to or greater than the threshold number of times Nsth, the CPU determines "Yes" in step 610 and proceeds to step 620. At step 620, threshold torque Trth is set to "Trb". Thereafter, the CPU proceeds to step 525 shown in FIG. 5.

Second Modification

The embodiment described above is also applicable to a steer-by-wire system in which the steering wheel is mechanically separated from the steered wheels.

Third Modification

Although the steering reaction force Fs is used as an index value representing the relationship between the steering direction and the target lateral position Ltgt, the present disclosure is not limited thereto. For example, the characteristics of the driver may be specified using the curvature CL (or radius of curvature) of the target lateral position Ltgt and the steering angle θt as index values.

Fourth Modification

The process of setting control parameters (control gains k1, k2, and k3, control threshold angle θtth, and threshold torque Trth) according to the driver's characteristics is executed every time the LTA routine shown in FIG. 5 is executed. There's no need. This process of setting the control parameters only needs to be executed once when the LTA switch 30 is operated when LTA is not being executed.

The present device 10 is applicable to vehicles such as engine vehicles, hybrid electric vehicles, plug-in hybrid electric vehicles, fuel cell electric vehicles, and battery electric vehicles. Furthermore, the control by the present device 10 is applicable even when switching from automatic operation to manual operation. Furthermore, the present disclosure can also be understood as a computer-readable non-transitory storage medium in which a program for realizing the functions of the present device 10 is stored.

What is claimed is:

1. A vehicle control device comprising:
   a memory; and
   a processor configured to
      perform lateral position control by adjusting steered wheels of a vehicle such that a target steered angle for the vehicle to travel coincides with an actual steered angle of the steered wheels, the target steered angle being a steered angle while the vehicle maintains a target lateral position within a travel area in which the vehicle travels,
      acquire a steering reaction force obtained during a non-control period in which the lateral position control is not executed, based on a relationship between a steering travel direction and the target lateral position, the steering reaction force prompting a driver to perform a steering operation to cause the vehicle to travel at the target lateral position, the steering travel direction indicating a travel direction of the vehicle in response to the steering operation on a steering wheel by the driver,
      apply the steering reaction force to the steering wheel,
      learn characteristics of the driver on a curved road based on the steering reaction force, and
      adjust control parameters to be used in the lateral position control based on the characteristics of the driver.

2. The vehicle control device according to claim 1, wherein:
   the memory stores information on the number of times that the driver steers the steering wheel against the steering reaction force when the steering travel direction is on an inner side with respect to the target lateral position during the non-control period; and
   the processor is configured to
      end the lateral position control when a steering operation torque applied by the driver to the steering wheel becomes equal to or greater than a threshold torque during execution of the lateral position control, and
      reduce the threshold torque when the number of times is equal to or greater than a threshold number of times.

3. A vehicle control method executed by a computer mounted on a vehicle, the vehicle control method comprising:
   performing lateral position control by adjusting steered wheels of the vehicle such that a target steered angle for the vehicle to travel coincides with an actual steered angle of the steered wheels, the target steered angle being a steered angle while the vehicle maintains a target lateral position within a travel area in which the vehicle travels;
   acquiring a steering reaction force obtained during a non-control period in which the lateral position control is not executed, based on a relationship between a steering travel direction and the target lateral position, the steering reaction force prompting a driver to perform a steering operation to cause the vehicle to travel at the target lateral position, the steering travel direction indicating a travel direction of the vehicle in response to the steering operation on a steering wheel by the driver;
   applying the steering reaction force to the steering wheel;
   learning characteristics of the driver on a curved road based on the steering reaction force; and
   adjusting control parameters to be used in the lateral position control based on the characteristics of the driver.

4. A non-transitory storage medium that stores instructions that are executable by a computer mounted on a vehicle and that cause the computer to perform functions comprising:
   performing lateral position control by adjusting steered wheels of the vehicle such that a target steered angle for the vehicle to travel coincides with an actual steered angle of the steered wheels, the target steered angle being a steered angle while the vehicle maintains a target lateral position within a travel area in which the vehicle travels;
   acquiring a steering reaction force obtained during a non-control period in which the lateral position control is not executed, based on a relationship between a steering travel direction and the target lateral position, the steering reaction force prompting a driver to perform a steering operation to cause the vehicle to travel at the target lateral position, the steering travel direction indicating a travel direction of the vehicle in response to the steering operation on a steering wheel by the driver;
   applying the steering reaction force to the steering wheel;
   learning characteristics of the driver on a curved road based on the steering reaction force; and
   adjusting control parameters to be used in the lateral position control based on the characteristics of the driver.

* * * * *